(12) United States Patent
Barton

(10) Patent No.: US 9,455,664 B2
(45) Date of Patent: Sep. 27, 2016

(54) SUPPORT FOR SOLAR ENERGY COLLECTORS

(71) Applicant: SUNPOWER CORPORATION, San Jose, CA (US)

(72) Inventor: Nicholas Barton, Richmond, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 14/714,002

(22) Filed: May 15, 2015

(65) Prior Publication Data
US 2015/0270803 A1 Sep. 24, 2015

Related U.S. Application Data

(63) Continuation of application No. 13/333,964, filed on Dec. 21, 2011, now Pat. No. 9,035,168.

(51) Int. Cl.
*H01L 31/0203* (2014.01)
*H01L 31/042* (2014.01)
*F24J 2/54* (2006.01)

(52) U.S. Cl.
CPC ............... *H02S 20/32* (2014.12); *F24J 2/541* (2013.01); *H02S 20/00* (2013.01); *F24J 2002/5468* (2013.01); *F24J 2002/5482* (2013.01); *Y02E 10/47* (2013.01); *Y02E 10/52* (2013.01); *Y10T 29/49826* (2015.01); *Y10T 29/49863* (2015.01)

(58) Field of Classification Search
CPC ................................ H02S 20/32; H02S 20/00
USPC ......................................................... 136/244
See application file for complete search history.

(56) References Cited

U.S. PATENT DOCUMENTS

| 4,153,474 A | 5/1979 | Rex |
| 4,323,719 A | 4/1982 | Green |
| 4,373,783 A | 2/1983 | Anderson |
| 4,456,332 A | 6/1984 | Anderson |
| 4,468,848 A | 9/1984 | Anderson et al. |
| 4,468,849 A | 9/1984 | Anderson et al. |
| 4,481,378 A | 11/1984 | Lesk |

(Continued)

FOREIGN PATENT DOCUMENTS

| DE | 10041271 | 3/2002 |
| DE | 202004005198 | 8/2004 |

(Continued)

OTHER PUBLICATIONS

Bardwell, et al., "Minimizing end shadowing effects on parabolic concentrator arrays," IEEE, 1980, pp. 765-770.

(Continued)

*Primary Examiner* — Jayne Mershon
(74) *Attorney, Agent, or Firm* — Knobbe, Martens, Olson & Bear LLP

(57) ABSTRACT

A solar energy collection system can include support devices made with bearings formed from sheet material. These bearings can be optionally formed so as to provide tool-less connections to their associated bearing housings. The bearings can be formed with an open configuration allowing a shaft to be inserted into an open bite of the bearing. Optionally, the bearing can be made from an ultrahigh molecular weight polyethylene plastic material. Additionally, two open-type bearing assemblies can be mounted axially offset and opposed to one another.

20 Claims, 18 Drawing Sheets

(56) References Cited

U.S. PATENT DOCUMENTS

| | | | |
|---|---|---|---|
| 4,502,200 A | 3/1985 | Anderson et al. |
| 4,640,734 A | 2/1987 | Roberts et al. |
| 4,643,543 A | 2/1987 | Mohn et al. |
| 4,643,544 A | 2/1987 | Loughran |
| 4,759,803 A | 7/1988 | Cohen |
| 5,180,441 A | 1/1993 | Cornwall et al. |
| 5,248,346 A | 9/1993 | Fraas et al. |
| 5,334,496 A | 8/1994 | Pond et al. |
| 5,344,496 A | 9/1994 | Stern et al. |
| 5,389,158 A | 2/1995 | Fraas et al. |
| 5,409,549 A | 4/1995 | Mori |
| 5,498,297 A | 3/1996 | O'Neill et al. |
| 5,580,395 A | 12/1996 | Yoshioka et al. |
| 5,616,185 A | 4/1997 | Kukulka |
| 5,660,644 A | 8/1997 | Clemens |
| 5,697,192 A | 12/1997 | Inoue |
| 5,865,905 A | 2/1999 | Clemens |
| 5,899,199 A | 5/1999 | Mills |
| 5,990,415 A | 11/1999 | Green et al. |
| 6,034,322 A | 3/2000 | Pollard |
| 6,131,565 A | 10/2000 | Mills |
| 6,323,478 B1 | 11/2001 | Fujisaki et al. |
| 6,359,209 B1 | 3/2002 | Glenn et al. |
| 6,442,937 B1 | 9/2002 | Stone |
| 6,553,729 B1 | 4/2003 | Nath et al. |
| 6,635,507 B1 | 10/2003 | Boutros et al. |
| 7,468,485 B1 | 12/2008 | Swanson |
| 7,554,031 B2 | 6/2009 | Swanson et al. |
| 7,709,730 B2 | 5/2010 | Johnson et al. |
| 7,820,906 B2 | 10/2010 | Johnson et al. |
| 7,825,327 B2 | 11/2010 | Johnson et al. |
| 7,932,461 B2 | 4/2011 | Johnson et al. |
| 7,952,057 B2 | 5/2011 | Finot et al. |
| 7,968,791 B2 | 6/2011 | Do et al. |
| 8,039,777 B2 | 10/2011 | Lance et al. |
| 8,049,150 B2 | 11/2011 | Johnson et al. |
| 8,071,930 B2 | 12/2011 | Wylie et al. |
| 8,083,362 B2 | 12/2011 | Finot et al. |
| 9,035,168 B2 | 5/2015 | Barton |
| 2004/0074490 A1 | 4/2004 | Mills et al. |
| 2007/0151598 A1 | 7/2007 | De Ceuster et al. |
| 2007/0257274 A1 | 11/2007 | Martter et al. |
| 2008/0035198 A1 | 2/2008 | Teppe et al. |
| 2008/0185040 A1 | 8/2008 | Tom et al. |
| 2009/0056699 A1 | 3/2009 | Mills et al. |
| 2009/0056785 A1 | 3/2009 | Johnson et al. |
| 2009/0056786 A1 | 3/2009 | Johnson et al. |
| 2009/0056787 A1 | 3/2009 | Johnson et al. |
| 2009/0095284 A1 | 4/2009 | Klotz |
| 2009/0139557 A1 | 6/2009 | Rose et al. |
| 2010/0154788 A1 | 6/2010 | Wells et al. |
| 2010/0163014 A1 | 7/2010 | Johnson et al. |
| 2010/0175740 A1 | 7/2010 | Johnson et al. |
| 2010/0193014 A1 | 8/2010 | Johnson et al. |
| 2010/0229852 A1 | 9/2010 | Buckley |
| 2010/0236626 A1 | 9/2010 | Finot et al. |
| 2010/0294336 A1 | 11/2010 | Johnson et al. |
| 2010/0319682 A1 | 12/2010 | Klotz |
| 2011/0023940 A1 | 2/2011 | Do et al. |
| 2011/0132457 A1 | 6/2011 | Finot |
| 2011/0162692 A1 | 7/2011 | Giacalone et al. |
| 2011/0186130 A1 | 8/2011 | Finot et al. |
| 2011/0226309 A1 | 9/2011 | Do et al. |
| 2011/0226310 A1 | 9/2011 | Johnson et al. |
| 2011/0265869 A1 | 11/2011 | Finot et al. |
| 2012/0216851 A1* | 8/2012 | Jang ............... F24J 2/5264 136/246 |

FOREIGN PATENT DOCUMENTS

| | | |
|---|---|---|
| DE | 10 2006 036 150 A1 | 2/2008 |
| DE | 10 2009 041 267 A1 | 3/2011 |
| GB | 2340993 | 3/2000 |
| JP | S58-46261 | 10/1983 |
| JP | 2007184542 | 7/2007 |
| JP | 2007194521 | 8/2007 |
| JP | 2007214247 | 8/2007 |
| JP | 3156576 | 12/2009 |
| KR | 1020070070183 | 7/2007 |
| KR | 1020090014153 | 2/2009 |
| KR | 10-2011-0048497 | 5/2011 |
| KR | 10-2011-0088693 | 8/2011 |
| WO | WO 99/57493 | 11/1999 |
| WO | WO 00/31477 | 6/2000 |
| WO | WO 2007/096157 | 8/2007 |
| WO | WO 2007/096158 | 8/2007 |
| WO | WO 2008/022409 | 2/2008 |
| WO | WO 2008/153922 | 12/2008 |
| WO | WO 2009/023063 | 2/2009 |
| WO | WO 2009/029275 | 3/2009 |
| WO | WO 2009/029277 | 3/2009 |
| WO | WO 2010/128708 | 11/2010 |
| WO | WO 2012/096715 A1 | 7/2012 |

OTHER PUBLICATIONS

Carroll, Don et al. "Production of the Alpha Solarco Proof-of-Concept Array," IEEE, 1990, pp. 1136-1141.

Edenburn, Michael W., et al. "Shading Analysis of a Photovoltaic Cell String Illuminated by a Parabolic Trough Concentrator," IEEE, 1981, pp. 63-68.

International Search Report and Written Opinion received in International Application No. PCT/US2012/057772, dated Mar. 18, 2013, filed on Sep. 28, 2012.

Quagan, Robert J., "Laser Diode Heat Spreaders," Ion Beam Milling, Inc., website copyright 2010, http://www.ionbeammilling.com/default.asp, 9 pgs.

Shepard, Jr., N. F. et al., "The Integration of Bypass Diodes with Terrestrial Photovoltaic Modules and Arrays," IEEE, 1984, pp. 676-681.

Stern, T. G., "Interim results of the SLATS concentrator experiment on LIPS-II (space vehicle power plants)," Photovoltaic Specialists Conference, 1988., Conference Record of the Twentieth IEEE, vol., No., pp. 837-840 vol. 2, 1988. URL: http://ieeexplore.ieee.org/stamp/stamp.jsp?tp-&arnumber=105822&isnumber=3239.

Vivar Garcia, Marta, "Optimisation of the Euclides Photovoltaic Concentrator," 2009, 390 pages.

European Search Report mailed Jun. 12, 2015, European Application No. 12860349.5 filed Dec. 21, 2012, 6 pages.

Japanese Office Action mailed Jul. 26, 2016 issued in Japanese Patent Application No. 2014-549032, 5 pages.

\* cited by examiner

SUPPORT FOR SOLAR ENERGY COLLECTORS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

Embodiments of the subject matter described herein relate generally to solar energy systems which include supports for solar energy collecting devices.

BACKGROUND

Larger solar collector installations usually include an array of solar collector devices. Such systems can be used in conjunction with photovoltaic modules, thermal solar collector devices as well as concentrators for concentrating solar energy onto photovoltaic devices or thermal solar collection devices.

Some of these solar collector installations include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis.

Further, in some of these systems, the torque tube can be used to both support the solar collector devices and transmit the torque used for adjusting the position of the solar collecting devices. In order to reduce friction which would resist the pivoting movement of the torque tube, some systems include bearings for supporting the torque tube above the ground and so as to be pivotable about the pivot axis.

Because the torque tubes pivot through a limited range of rotation about the axis, conventional roller bearings are not necessary for such applications. Rather, roller bearings would present an unnecessarily large expense. Thus, some sun tracking solar systems include other types of bearings.

BRIEF SUMMARY

An aspect of at least one of the inventions disclosed herein includes the realization that costs for constructing sun tracking solar collection systems can be reduced by using bearings that are lower cost and less mechanically complex than a conventional roller bearing. For example, some solar systems are designed to pivot the solar collection devices over a range of motion of only about 30-60° for each side relative to a vertical alignment. Additionally, in some designs, the bearing supports for the torque tubes can be disposed between mounts of other devices that are connected directly to the torque tube. Such devices would normally would interfere with the installation of a typical roller bearing installation. Thus, a bearing that can be mated with a torque tube at a position between other components connected to it, such as mounts for solar collector devices that may be preinstalled at a factory, can help reduce the labor required for installing such solar systems.

Thus, in accordance with at least one of the embodiments disclosed herein, a sun-tracking photovoltaic solar collector array can comprise plurality of photovoltaic devices. A support assembly can support the photovoltaic devices so as to be pivotable about a pivot axis. The support assembly can comprise at least a first pivot supporting the plurality of photovoltaic modules, at least a first bearing supporting the first pivot so as to be pivotable about the pivot axis, and at least one pier supporting the bearing at a position above a support surface. The bearing can comprise at least a first reduced friction member extending around a first arc of at least about 100 degrees about the first pivot, the first reduced friction member comprising a first end, a second end, and a central portion, the first and second ends being spaced apart sufficiently to allow at least a portion of the first pivot to pass between the first and second ends.

In accordance with another embodiment, a method of assembling a sun-tracking photovoltaic solar collector array can comprise mounting a first bearing housing at a position above the ground, inserting a first bearing member into the first bearing housing such that the first bearing member sags downwardly with first and second terminal ends of the first bearing member are spaced apart thereby having an upwardly facing bite, and lowering a torque tube such that a portion of the torque tube passes between the first and second terminal ends of the first bearing member and onto the bite of the first bearing member. The first bearing member can provide reduced friction with an outer surface of the torque tube such that the torque tube can pivot relative to the first bearing member, where the torque tube supports a plurality of photovoltaic devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
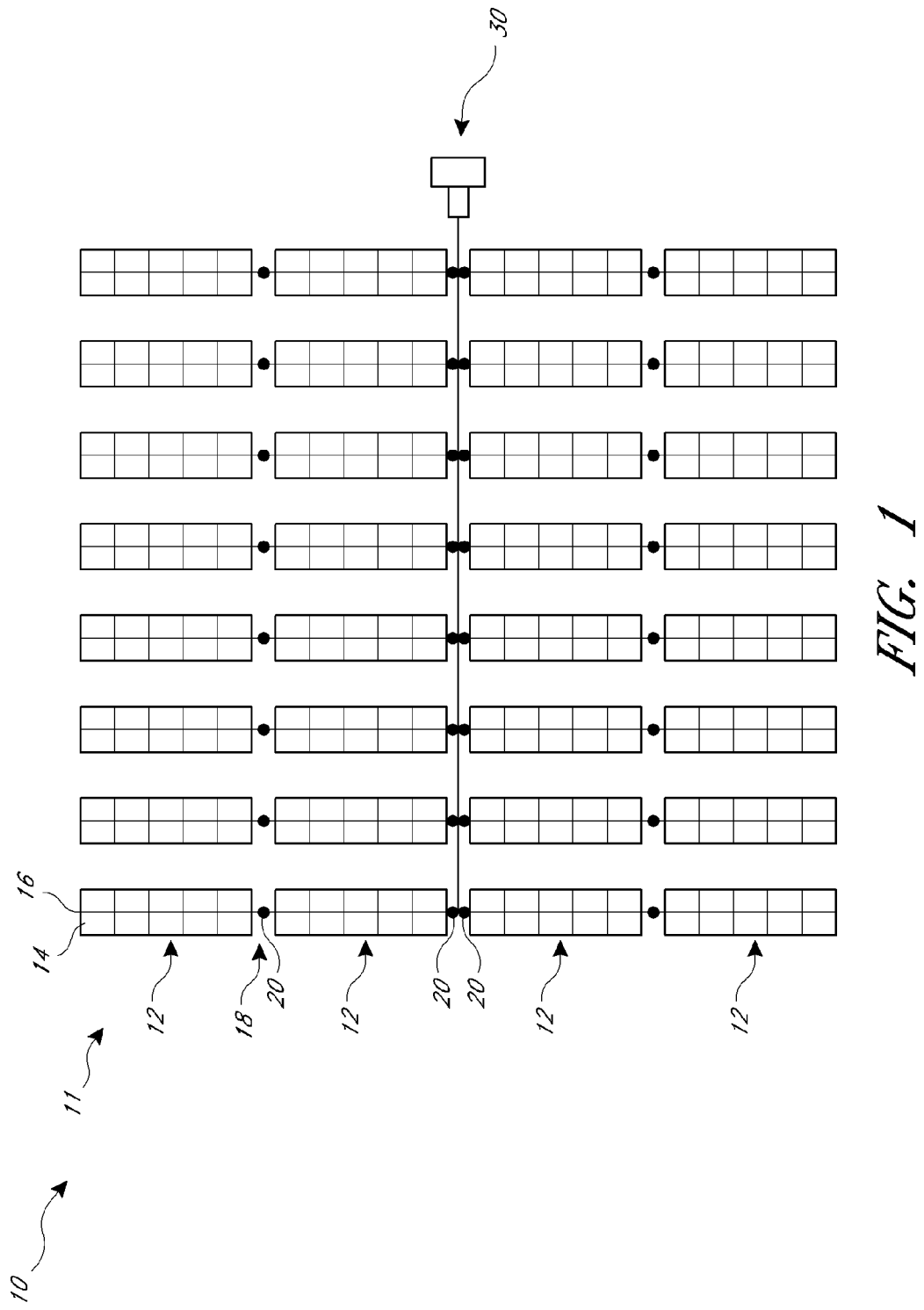
FIG. 1 is a schematic top plan view of a solar collector system accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

"Tool-less connection"—The following description refers to devices or features being connected with "tool-less connections". As used herein, unless expressly stated otherwise, "tool-less connection" means that one element/node/feature is directly or indirectly joined to (or directly or indirectly communicates with) another element/node/feature with a mechanism that can be operated by a human without any tools or other separate parts to achieve a joined state and optionally to be disconnected from the joined state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are described in the context of photovoltaic arrays and modules. However, these inventions can be used in other contexts as well, such as concentrated PV systems, thermal solar systems, etc.

In the description set forth below, a solar energy collection system 10 is described in the context of being formed by a plurality of solar collection modules, supported so as to be pivotally adjustable for sun-tracking purposes. Each of the modules can include a support member supporting a plurality of solar collection devices as well as wiring for connecting the various solar collection devices to each other and to other modules. The system 10 can also include devices for reducing labor, hardware, or other costs associated with installing such a system. For example, the collection system or the modules included in such a system can be supported above the ground with bearing assemblies that include one or more various features designed to reduce the cost of the manufacture of such bearings and simplify the installation of related components at an installation site.

FIG. 1 illustrates the solar collection system 10 including a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a pile and a bearing assembly 20, described in greater detail below with reference to FIGS. 5-18.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 are connected to each other in an end to end arrangement, as more fully described in U.S. patent application Ser. No. 13/176,276, filed Jul. 5, 2011, the entire contents of which is hereby expressly incorporated by reference. However, inventions disclosed herein can be used in the context of other types of arrangements. For example, the system 10 can include a plurality of modules 12 that are arranged such that the torque tube 16 is inclined relative to horizontal, wherein the torque tubes 16 are not connected in an end to end fashion, such as the arrangement illustrated and disclosed in U.S. Patent Publication No. 2008/0245360. In that context of the use, the bearing assemblies 20 can be used in place of the bearings identified by the reference 40 in FIG. 6 and described in paragraph [0033] as well as bearings identified by the reference 72 in FIG. 8 and described in paragraph [0037] of the 2008/0245360 patent publication. The entire contents of the 2008/0245360 patent publication is hereby expressly incorporated by reference including the illustrations and the descriptions of the bearings 40 and 72.

Figure 2:
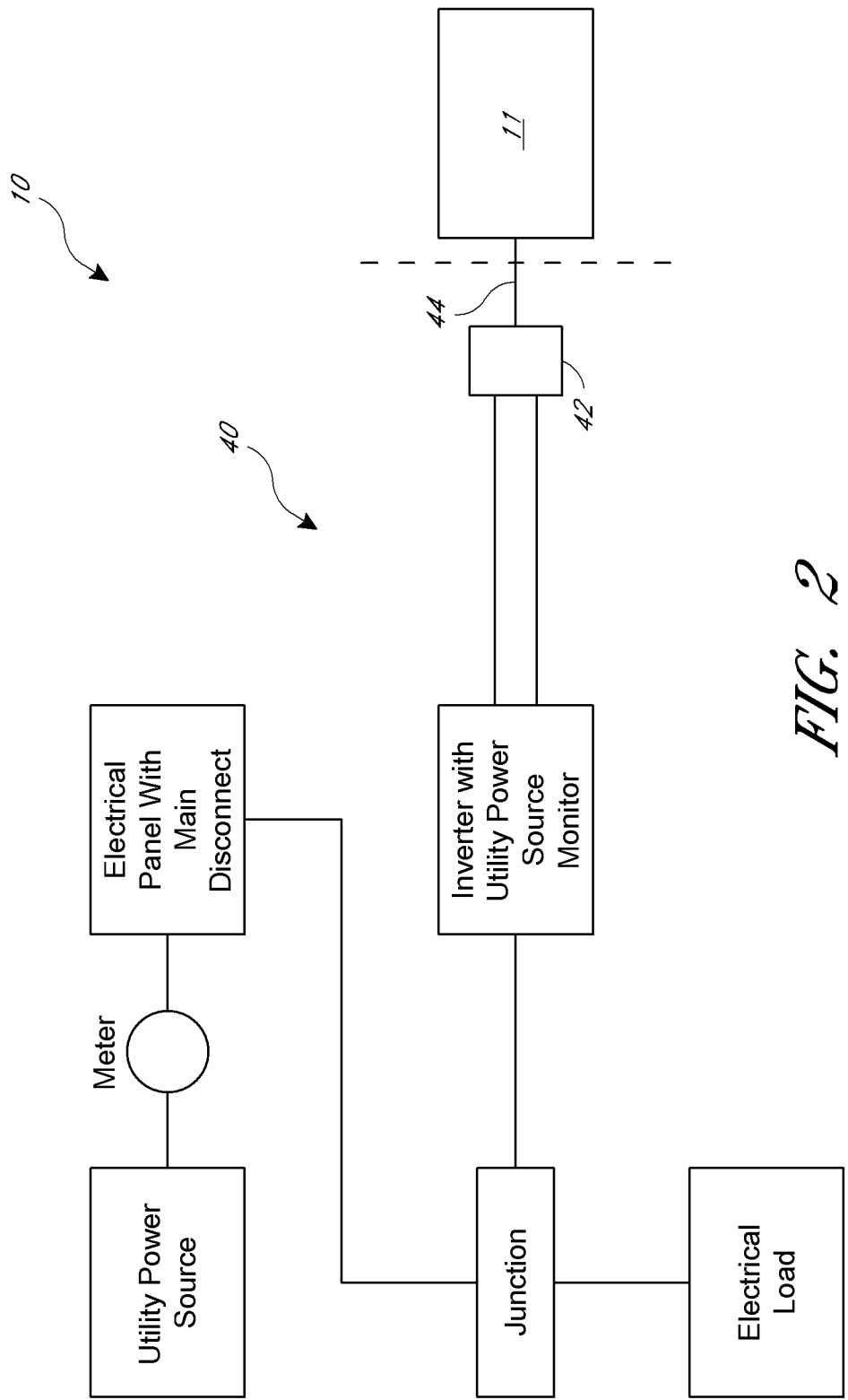
FIG. 2 is a schematic diagram of the system illustrated in FIG. 1 illustrating optional electrical connections of the collector system with various electrical components.

In embodiments where the torque tubes 16 are arranged horizontally and the modules 12 are connected in an end to end fashion, the bearing assemblies 20 can be used in place of the bearings mounted on top of supports 16 in FIG. 2 of U.S. Patent Publication No. 2010/0139646. Further, the drive system 30 can be constructed and operated in the manner disclosed with regard to the tilt assembly 50 of U.S. Patent Publication No. 2010/0139646. The entire contents of U.S. Patent Publication No. 2010/0139646 is hereby expressly incorporated by reference.

Additionally, the solar collection devices 14 can be in the form of photovoltaic panels, thermal solar collection devices, concentrated photovoltaic devices, or concentrated thermal solar collection devices. In the illustrated embodiment, the solar collection devices 14 are in the form of photovoltaic panels.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 3:
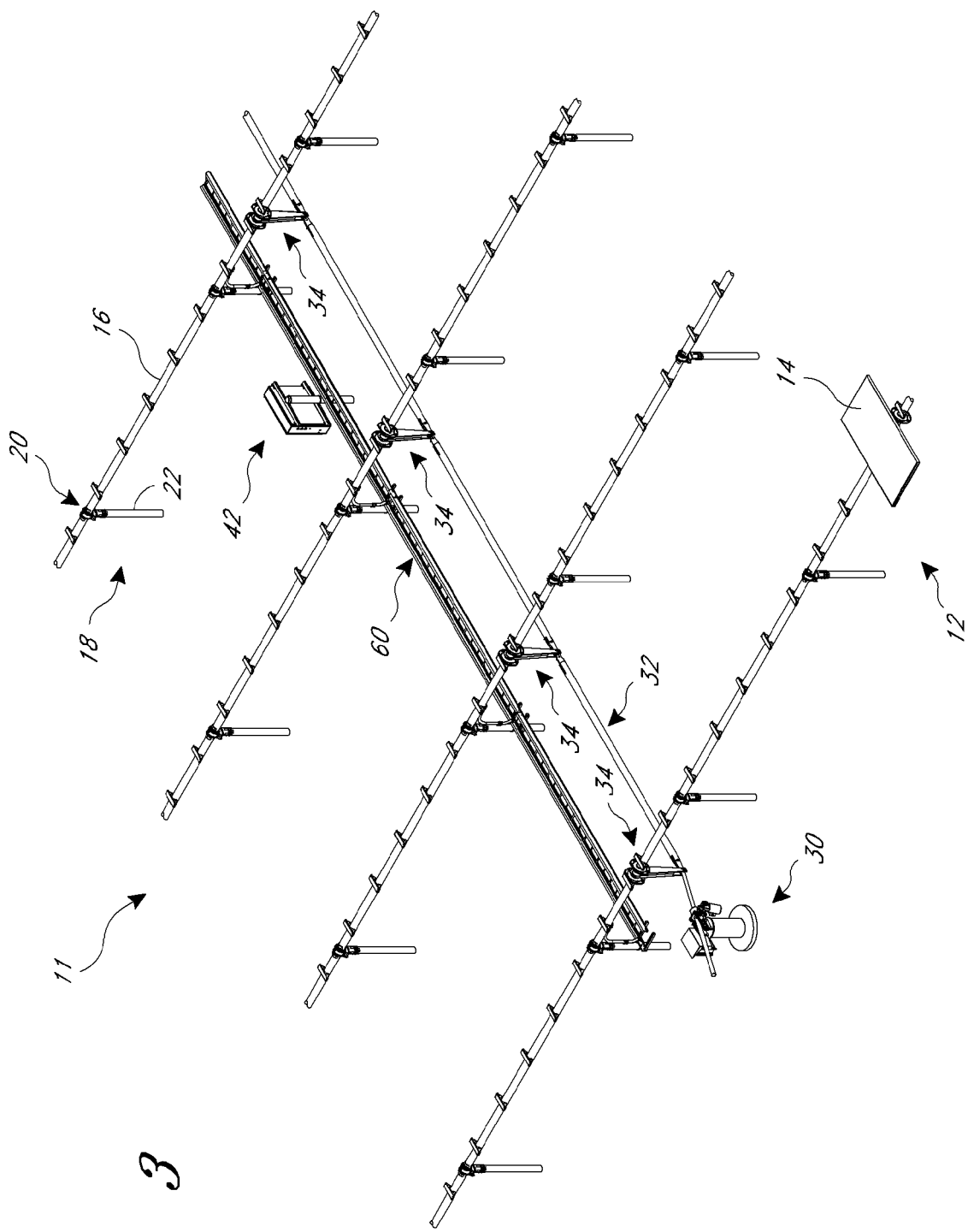
FIG. 3 is a perspective view of the solar collection system of FIG. 1, and illustrating a tracking drive system, a plurality of piles mounted to the ground and supporting a plurality of torque tubes with a plurality of bearing assemblies, in accordance with an embodiment.

FIG. 3 illustrates the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include an electrical wire tray 60 supported by one or more of the piles 22, or by other means.

Figure 4:
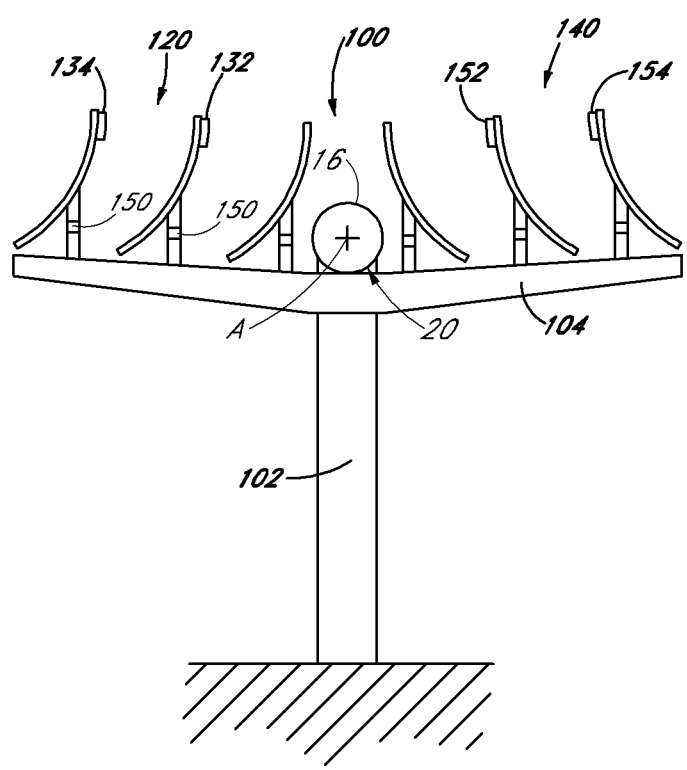
FIG. 4 is a schematic side elevational view of a concentrated photovoltaic sun tracking assembly in which the bearing assemblies of FIG. 3 can also be used.

As noted above, and with reference to FIG. 4, the array 11 can be in the form of a plurality of sun tracking, concentrated photovoltaic arrangements. For example, as shown in FIG. 4, a concentrated photovoltaic solar assembly 100 can include a pile 102 which supports a cross beam 104 and a torque tube 16. The cross beam 104 in turn supports first and second groups of concentrated elements 120, 140, supported by the cross beam 104.

In the illustrated embodiment, one group of concentrated elements 120 face in one direction and the second group of concentrated elements 140 are positioned so as to face the opposite direction, with the changeover between them occurring at the torque tube 106. The pier 102 can be a single post or one of several supporting the solar concentrator assembly 100.

Connectors 150 support the concentrator elements 120, 140 relative to the cross beam 104. Additionally, photovoltaic collectors 132, 134, 152, 154 can be mounted on the back sides of the concentrator elements 120, 140. In this configuration, each of the concentrator elements 120, 140 are configured to focus a band of concentrated light onto the photovoltaic units 132, 134, 152, 154. A sun-tracking drive system can drive the torque tube 16 to pivot about the pivot axis A. Further detail regarding the optional configuration of a concentrated photovoltaic environment of use for the bearings 20 is set forth in U.S. patent application Ser. No. 12/977,006 filed Dec. 22, 2010, the entire contents of which is hereby incorporated by reference.

Figure 5:
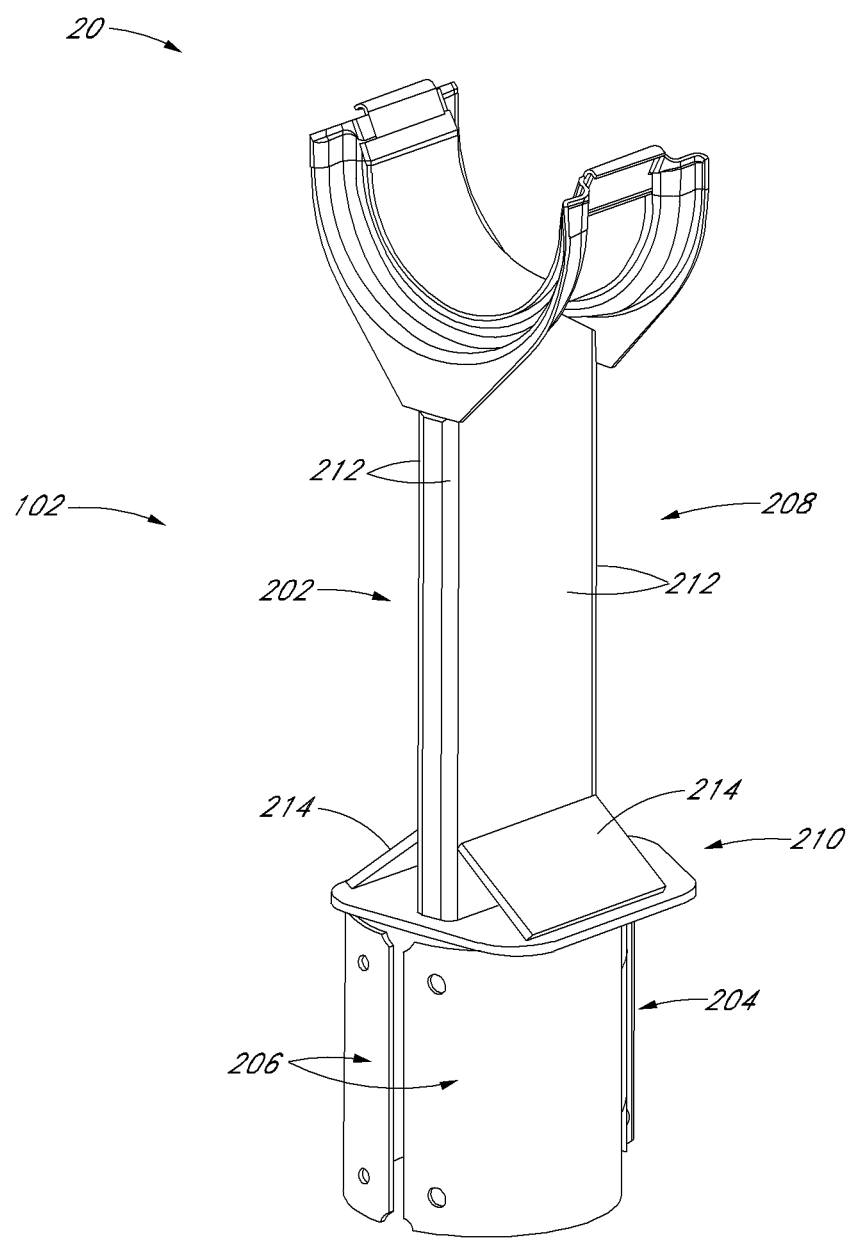
FIG. 5 is a perspective view of an embodiment of the bearing assembly illustrated in FIG. 3 supported by an optional design for a pile.

With reference to FIG. 5, the bearings 20 can be supported directly on piers 102 described above with reference to FIGS. 1-4. Optionally, the bearings 20 can be supported upon an optional bearing support 202.

As shown in FIG. 5, the bearing support 202 can include a lower end 204 which can be configured to provide a secure connection to a cylindrical pier, such as the piers 102 illustrated in FIGS. 3 and 4. In such embodiments, the lower portion 204 includes a plurality of mounting plates 206 configured to extend around an upper end of a cylindrical pier 102. Fasteners (not shown) can be used to attach the plates 206 to the upper end of a pier 102.

The support 202 also includes an upper end 208. A mounting plate 210 can be disposed between the lower portion 204 and the upper portion 208. The mounting plate 210 can be securely connected to the plates 206 by any desired means, such as for example but without limitation, welding.

The upper portion 208 is also connected to the mounting plate 210. In some embodiments, the upper portion 208 includes a box beam configuration formed of four plates 212 connected together to form a generally vertically extending support structure. However, other configurations can also be used.

The lower end of the upper portion 208 can be further fixed to the mounting plate 210 with gussets 214. The upper end of the upper portion 208 is secured to the bearing 20.

Figure 6:
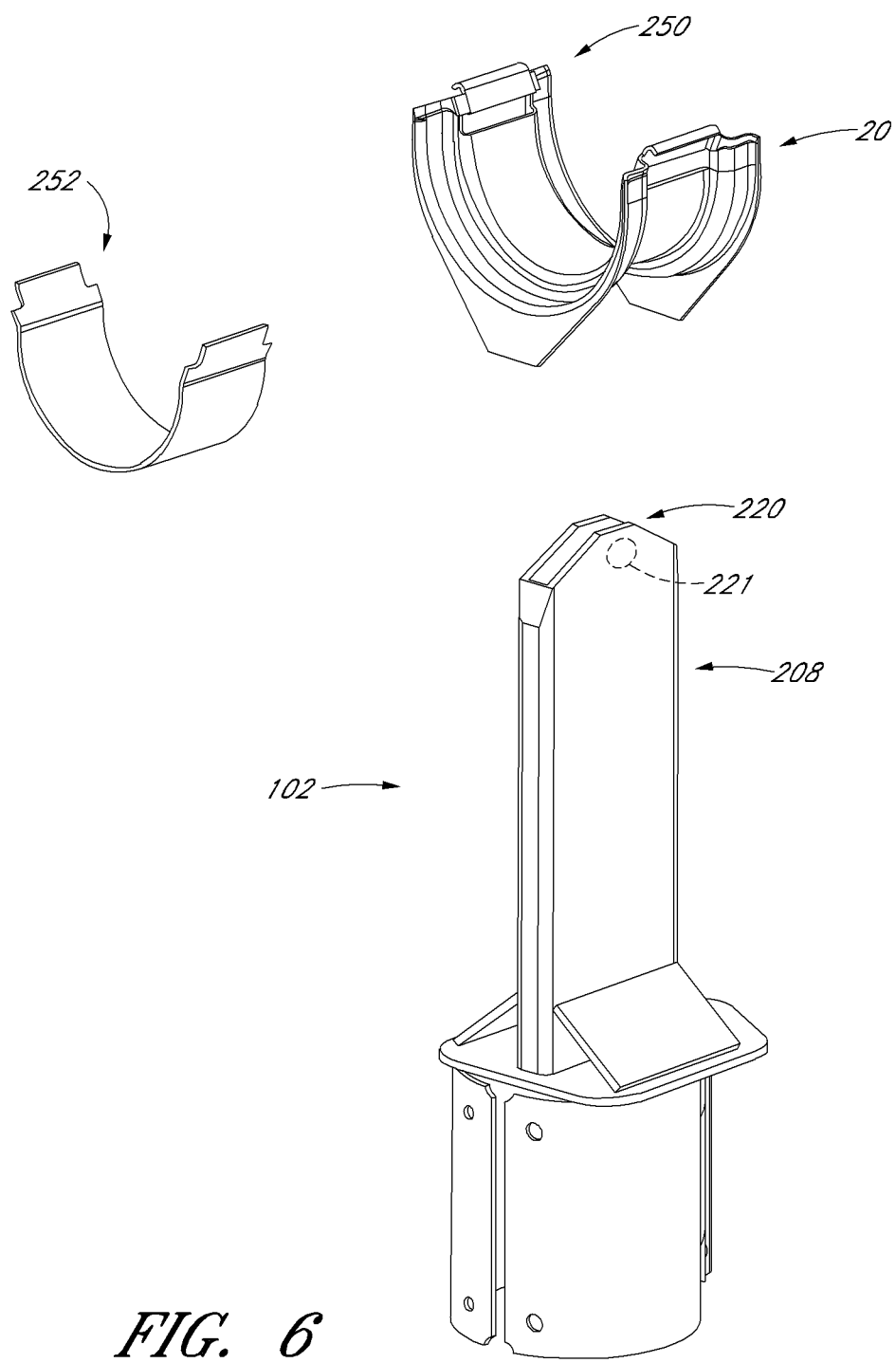
FIG. 6 is an exploded view of the bearing assembly illustrated in FIG. 5.
Figure 10:
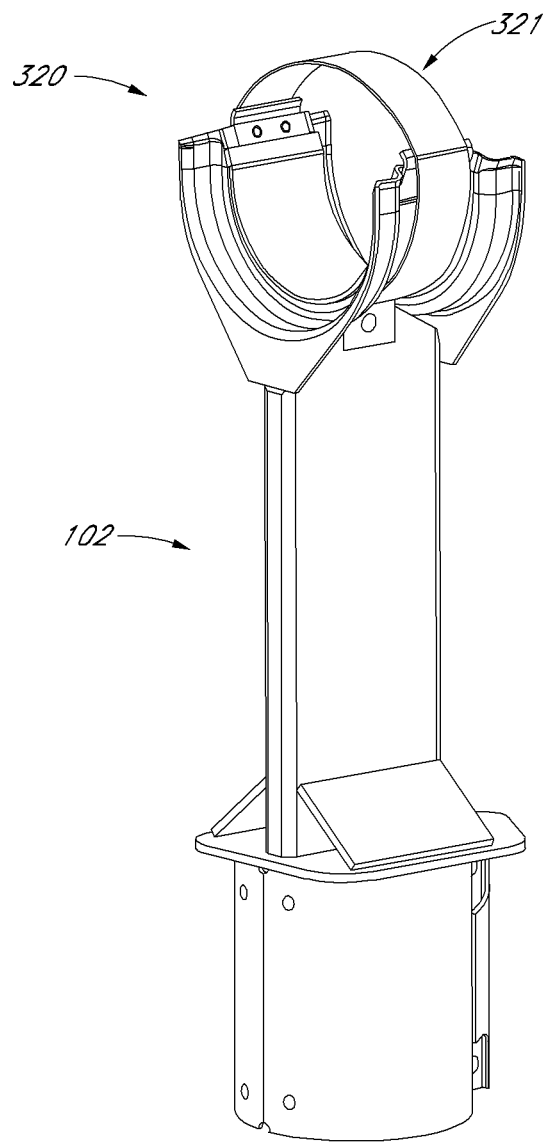
FIG. 10 is a perspective view of another embodiment of the bearing assembly supported by a pier.

With reference to FIG. 6, the upper end 220 of the upper portion 208 can be provided with a shape complementary to a shape of the lower surface of the bearing 20. Whether having such a complementary shape or a different shape, the upper ends 220 can be fixed to the bearing 20 by welding or any other method of engagement. Additionally, the upper portion 208 can include an aperture 221 which can be configured to receive a fastener, such as a bolt, for securing a safety strap 321 (FIG. 10).

Figure 7:
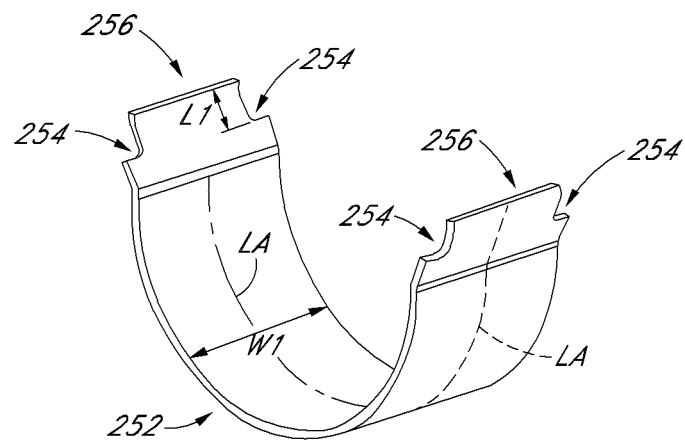
FIG. 7 is an enlarged perspective view of a bearing member of the assembly illustrated in FIG. 6.
Figure 8:
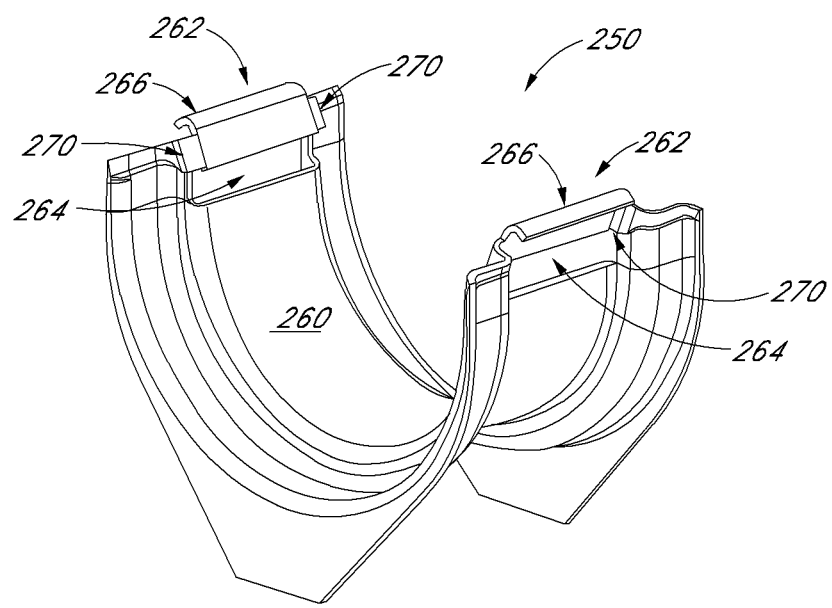
FIG. 8 is an enlarged perspective view of a bearing housing of the bearing assembly illustrated in FIG. 6.

As shown in FIGS. 6-8, the bearing 20 can include a housing 250 and a bearing member 252. In some configurations, optionally, the bearing 20 can be configured such that the bearing member 252 rests in the housing 250 in such a way that it is essentially "trapped" within the housing 250, for example, with a tool-less connection.

With reference to FIG. 7, in some embodiments, the bearing member 252 can be made from a sheet material designed to provide reduced friction when sliding against an outer surface of a torque tube 16. As noted above, the torque tube 16 can be made out of any desired material. In some embodiments, the torque tube 16 is formed of hot dipped galvanized steel. In some embodiments, the bearing 252 can be made from an ultra high molecular weight polyethylene (UHMWPE) plastic material. However, other materials can also be used, such as grease soaked cotton, wood, Delrin, Nylon, Polyethylene, Polyurethane, Polytetrafluoroethylene, Brass, Polystyrene, Polyoxymethylene, Acrylonitrile butadiene styrene, Polyamide, or Polyphenylene Oxide.

With continued reference to FIG. 7, in some embodiments, the bearing member 252 can have a generally rectangular configuration with a first width W1. and can extend longitudinally along a longitudinal axis LA. In the illustrated embodiment, the bearing member 252 includes shoulders 254 at each end with a protruding portion 256 disposed between the shoulders 254, also at each end. The protruding portions 256, as illustrated in FIG. 7, extend a length L1 beyond the shoulders 254.

The overall length of the bearing member 252, the length L1 of the protruding portion 256, the size of the shoulders 254, and the width W1 of the bearing member 252 can be chosen so as to cooperate with corresponding components of the housing 250. For example, the parameters and characteristics of the bearing member 252 noted above can be chosen such that the bearing member 252 can rest within the housing 250 so as to be trapped.

For example, the housing 250 can include a bearing member support surface 260 and end receivers 262. The arrangement and configuration of the end receivers 262 can be configured to cooperate with the shoulders 254 and the projecting portions 256 so as to retain the bearing member in an operational alignment during use. Optionally, the housing can include apertures 264 and end stops 266. In such a configuration, the apertures 264 can include lateral ends 270 which define stops for the shoulders 254. Additionally, the end stops 266 can define stops for the terminal ends of the protruding portions 256. Further, the position of the end stops 266 can be disposed so as to result in a close proximal spacing or contact with the terminal ends of the protruding portions 256.

Figure 9:
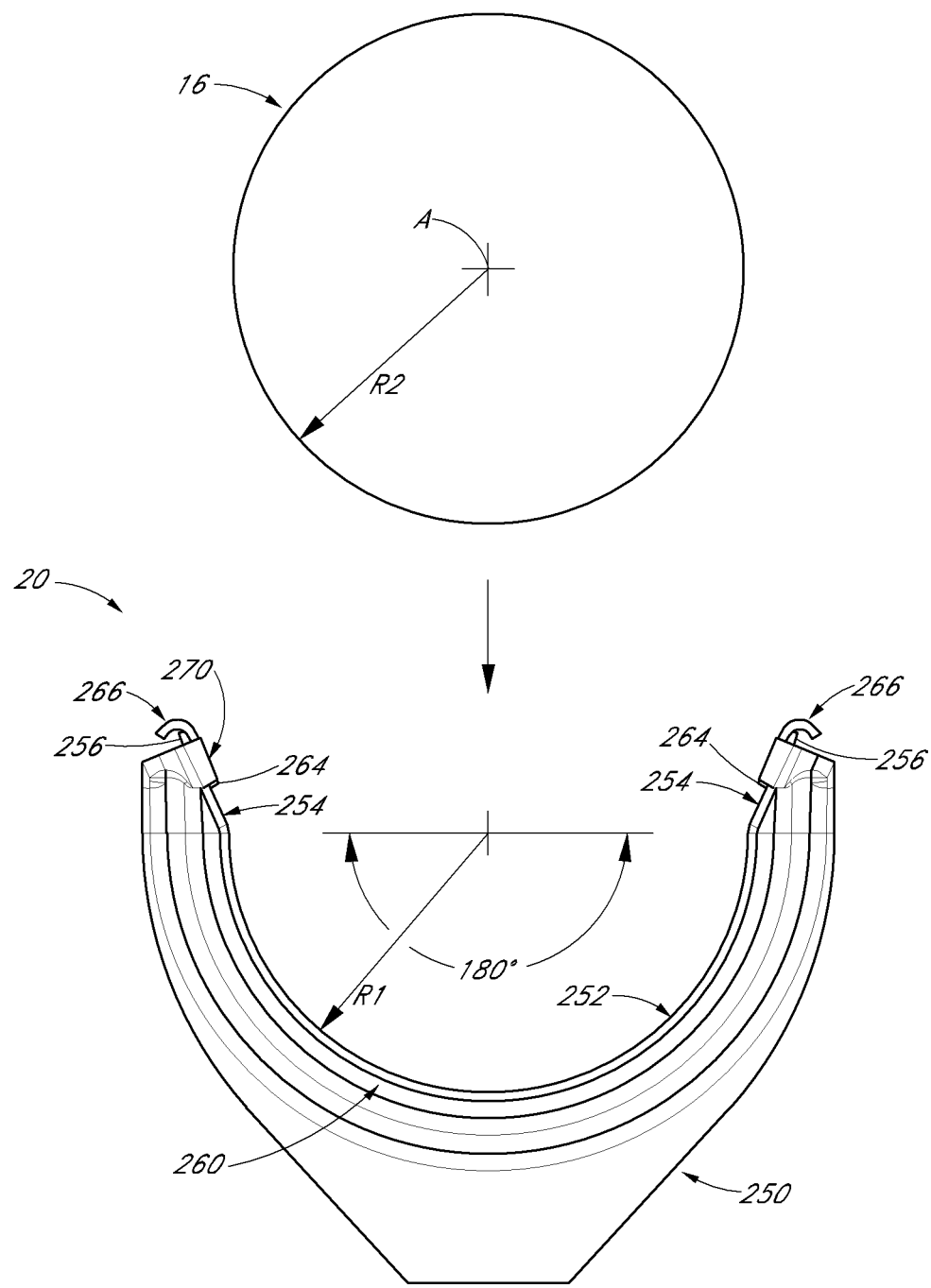
FIG. 9 is a front elevational view of the bearing housing illustrated in FIG. 8.

For example, as illustrated in FIG. 9, the bearing member 252, when installed in the housing 250, can rest against the support surface 260 of the housing 250. Each of the ends of the bearing member 252 can extend through the apertures 264 such that the terminal ends of the protruding portions 256 lie in close proximity or in contact with the stops 266. Additionally, the shoulders 254 can rest against the stops 270 formed at the lateral edges of the apertures 264. In this configuration, the bearing member 252 can be "trapped" within the housing 250, and thereby resist movement that may tend to shift the bearing member 252 out of the housing 250. Additionally, the bearing member 252 can be installed into the housing without any tools. Thus, the connection between the bearing member 252 and the housing 250 can be considered a tool-less connection.

The size of the housing and the bearing member 252 can be configured such that the inner surface of the bearing member 252 lies along a radius of curvature R1 that is close to, approximately the same, or slightly larger than the outer radius R2 of the torque tube 16. Thus, the torque tube 16 can pivot about its pivot axis A such that the outer surface of the torque tube 16 slides against the inner surface of the bearing member 252.

As shown in FIG. 9, the housing 250 and the bearing member 252 are configured so as to extend along the radius R1 over an arc of about 180°. The terminal ends of the bearing member 252 flare away from the inner portion of the bearing 20 past the 180° of curvature. As such, with the bearing member 252 and housing 250 mounted to a top of a pier, a torque tube 16 can be lowered down onto the bearing 20 and into sliding engagement or sliding contact with the bearing member 252 with the bearing member 252 and the housing 250 in a fully assembled state. In other words, the terminal ends of the bearing member 252 are positioned such that at least a portion (e.g., the lower half) of the torque tube 16 can pass between the terminal ends.

This can provide an important advantage in the installation process of a solar system. For example, as noted above, the torque tube 16 can be premanufactured with many components mounted or fixed thereto with welding and/or fasteners. This allows for high precision mounting and manufacturing of such systems in a facility ("factory") for providing high precision and high speed assembly. With such portions of the system prefabricated, and in particular, braces and supports directly connected to the torque tube 16, the torque tube 16 can be lowered onto an assembled bearing 20.

This manner of insulation is not possible using devices commonly known as "roller bearings" which normally have to be slid over one end of a cylindrical member such as a torque tube 16. Additionally, if the bearing 20 or any of its components need replacement, the torque tube 16 could be supported just above its normal position during operation, and a replacement component such as a bearing member 252 can be installed.

It is not necessary that the bearing member 252 extend around the torque tube 16 for a complete 180°. Rather, in some embodiments, the housing 250 and bearing member 252 can be configured to follow the radius of curvature R1 around about 100° around the torque tube 16. Along these lines, the housing 250 and the bearing member 252 can be configured to extend around any portion of the outer surface of the torque tube 16, such as, between 100° and 180° around the torque tube 16.

In the configuration illustrated in FIGS. 5-9, the bearing member 252 is loaded almost purely in compression, without any tension forces exerted thereon. This is because the ends of the bearing member 252 are not fixed relative to the housing 250. Rather, they can move relative to the housing 250, to some extent.

FIG. 10 illustrates another embodiment of the bearing 20, and is identified by the reference numeral 320. Components of the bearing 320 can be similar or the same as those of the bearing 20 and have been identified with the same reference numerals, except that 100 has been added to the reference numerals used to identify components of the bearing 20.

Figure 11:
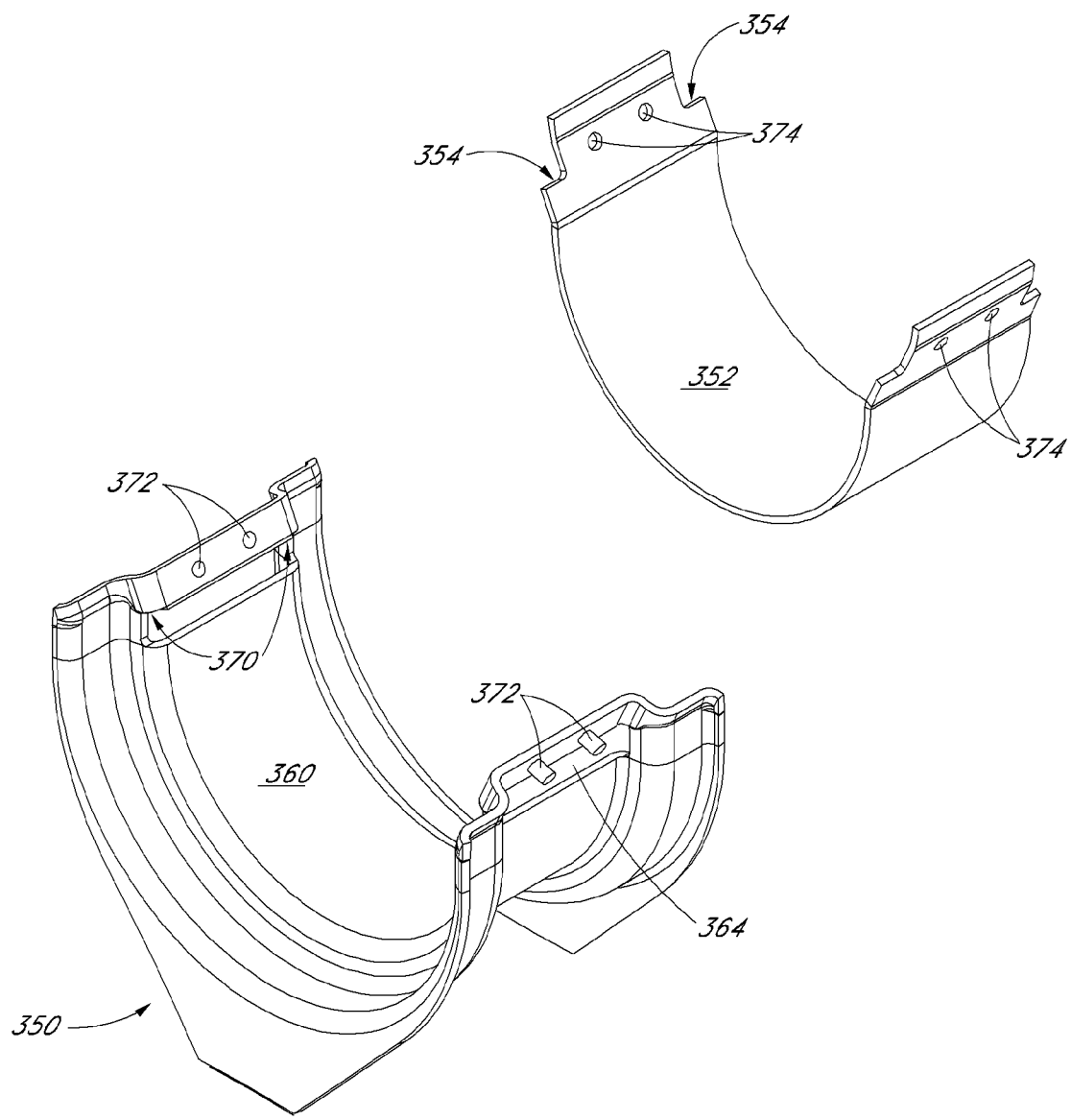
FIG. 11 is an exploded view of the bearing assembly illustrated in FIG. 10.
Figure 12:
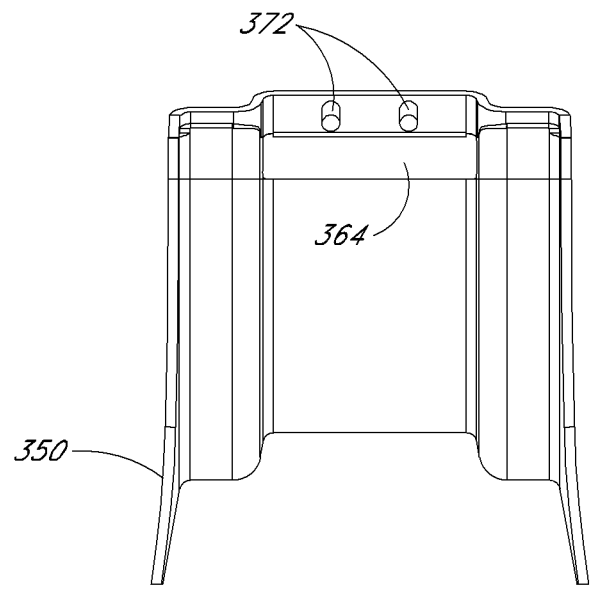
FIG. 12 is a side elevational view of the bearing housing illustrated in FIG. 11.
Figure 13:
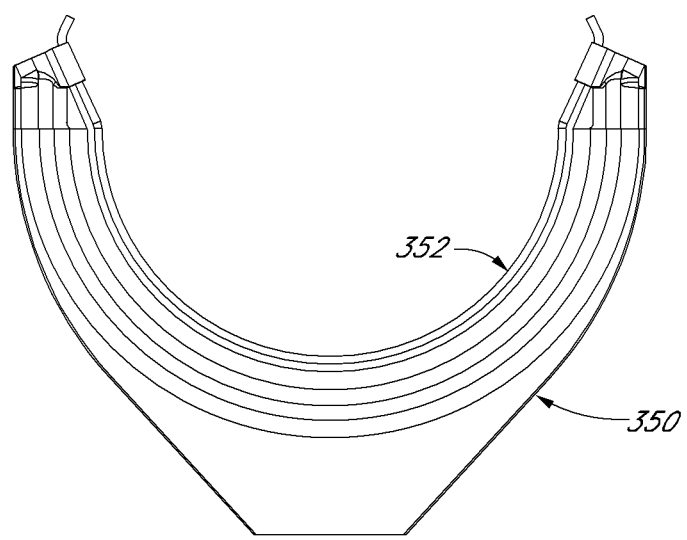
FIG. 13 is a front elevational view of the bearing assembly illustrated in FIG. 10 with the bearing member installed therein.

With reference to FIG. 10, the bearing 320 can include a safety strap 321 that can extend over the bearing 320 so as to prevent any inadvertent movement of a torque tube 16 off of the bearing 320. The safety strap 321 can be made from any material, including, for example, but without limitation, sheet steel, aluminum, polyurethane, etc. With reference to FIGS. 11-13, the housing 350 of the bearing 320 can include fasteners 372 that can be configured to engage with apertures 374 disposed near the terminal ends of the bearing member 352.

As shown in FIG. 13, the bearing member 352 can be mounted to the housing 350 in a manner similar to that described above with reference to the bearing 20 and FIG. 9. However, in this embodiment, the apertures 374 can align with the fasteners 372 so as to further secure the terminal ends of the bearing member 352 relative to the housing 350.

In such an embodiment, the bearing member can be loaded additionally in tension due to the interaction between the fasteners 372 and the apertures 374. However, due to the other corresponding components of the bearing member 352 on the housing 350, such as the shoulders 354 and stops 370, it is not necessary for the fasteners 372 to be in the form of rivets, bolts, or other type of fastener for more permanently fixing the bearing member 352. Rather, the fasteners 372 can be in the form of pins sufficient to retain the bearing member 352 in place.

Further, the fasteners 372 can be provided with sufficient strength to provide some load on the bearing member 352 in tension, during use. For example, the length of the bearing member 352 can be made sufficiently short such that the bearing member 352 does not lie against the surface 360 of the housing 350 when the apertures 374 are engaged with the fasteners 372. Thus, when a torque tube 16 is lowered onto the bearing member 352, the bearing member 352 can be stretched due to the interaction of the apertures 374 with the fasteners 372 and the weight of the torque tube 16. Thus, the bearing member can be loaded both in tension and compression during use in such an embodiment.

Figure 14:
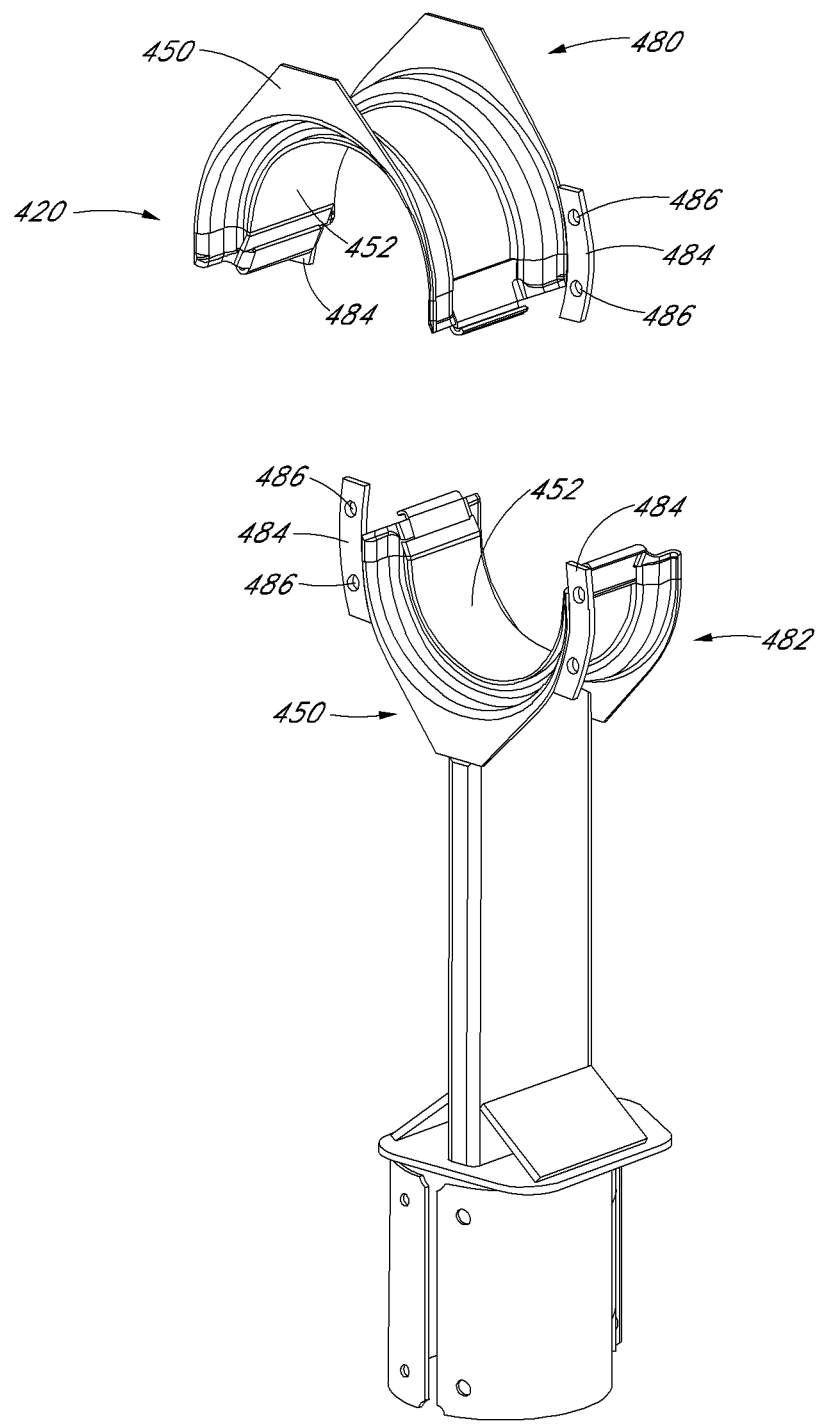
FIG. 14 is a perspective exploded view of another embodiment of the bearing assembly having a lower portion and an opposed, axially offset, upper portion.

FIG. 14 illustrates yet another embodiment of the bearing assembly 20, identified by the reference numeral 420. Generally, the embodiment of FIG. 14 is formed with two sets of the housings 250 and bearing members 252 of the embodiment of FIGS. 5-9, arranged in an axially offset and opposed configuration. Thus, for example, the bearing 420 can be formed of an upper portion 480 and a lower portion 482, each of which can be formed by the combination of the housing 250 and bearing member 252 of the embodiments of FIGS. 5-8, except with the additional components noted below. Thus, the various components of the upper and lower portions 480, 482 will not be further described below.

Figure 15:
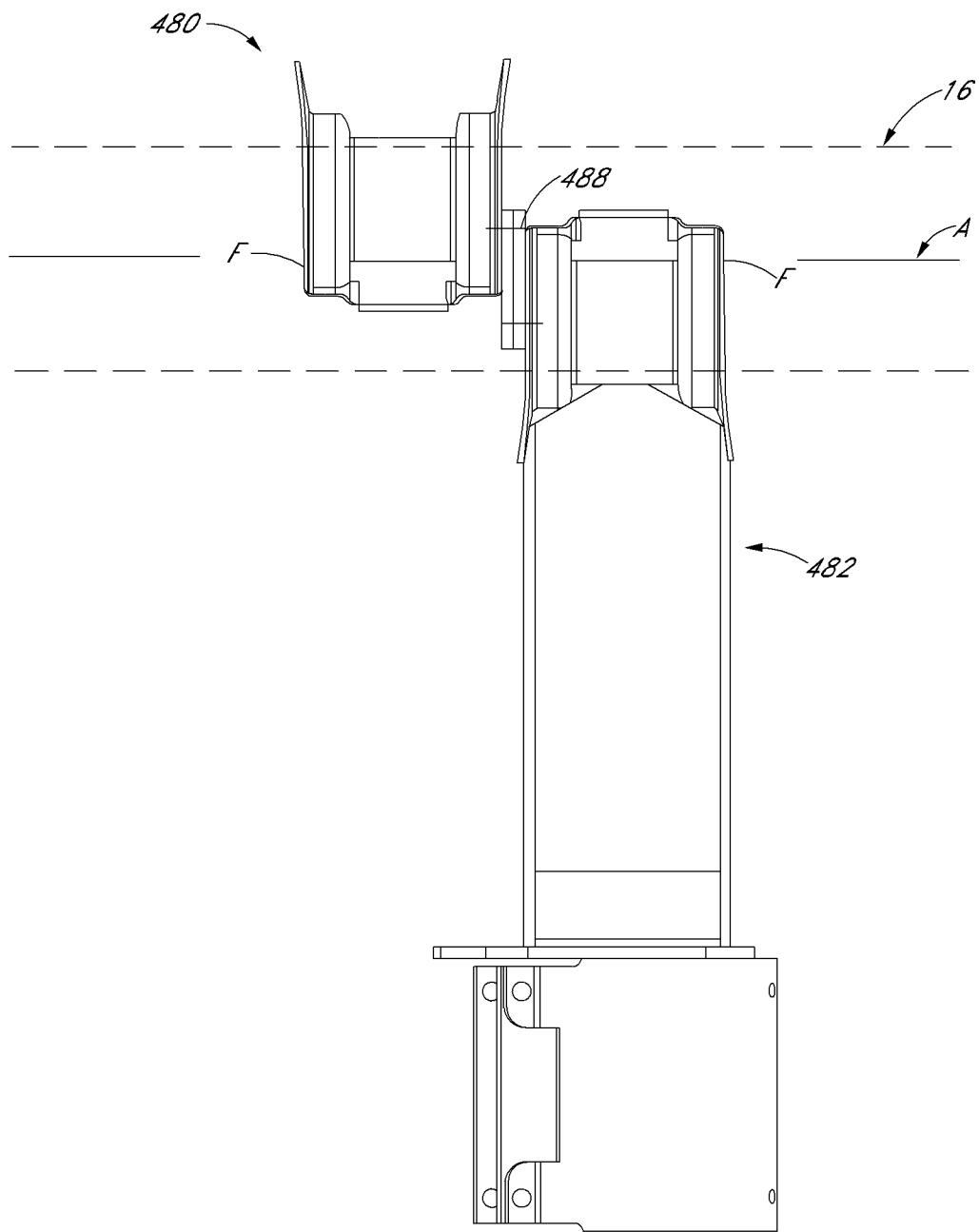
FIG. 15 is a side elevational view of the bearing assembly of FIG. 14.
Figure 16:
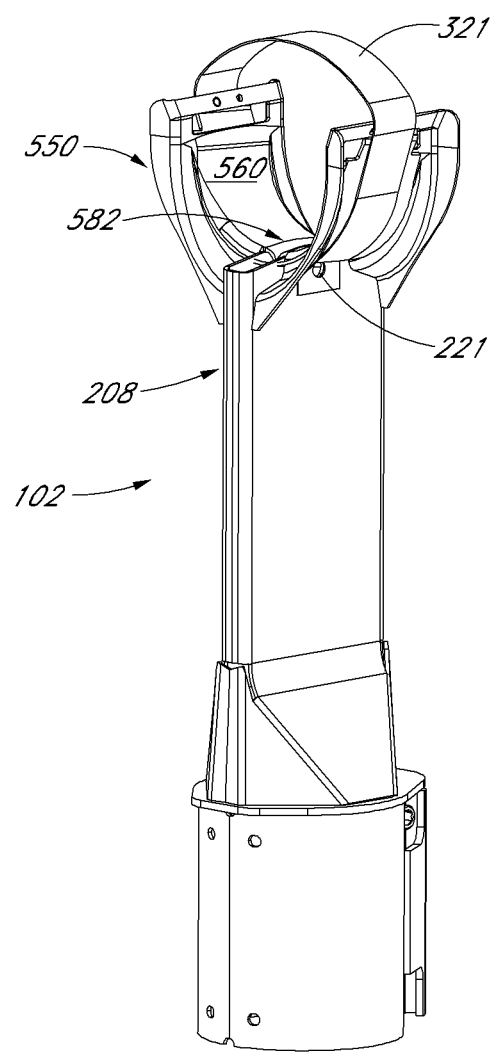
FIG. 16 is a perspective view of yet another embodiment of the bearing assembly having a two-part housing and a safety strap.

In the orientation illustrated in FIG. 15, the lower portion 482, having a generally u-shaped configuration, has an upwardly facing "bite". Similarly, the upper portion 480 has a downwardly-facing "bite". Additionally, this orientation can be described as the upper and lower portions 480, 482, being axially offset (along the axis A) and opposed because their respective "bites" face toward each other.

With continued reference to FIGS. 14 and 15, each of the lower portions and upper portions 482, 480 can include side mounting members 484. The mounting members 484 can be in the form of plates rigidly fixed or formed monolithically with the corresponding housings 450. In some embodiments, the mounting members 484 can include apertures 486.

With reference to FIG. 15, in some embodiments, the upper and lower portions 480, 482 can be positioned such that the apertures 486 in the mounting members 484 align with one another. In this configuration, fasteners 488 can be secured through the aligned apertures 484 for securing the upper portion 480 and the lower portion 482 to each other. Additionally, the apertures 486 in the mounting members 484 can be aligned such that the focal points F of the radiuses of the curvature of each of the inner surface of the bearing members 452. Normally, during use, the focus point F of the radius of curvature of the inner surfaces of the bearing members 452 will be aligned generally with the pivot axis A of the torque tube 16.

This type of configuration can provide a further benefit in some installations. For example, some solar systems can generate large lift forces on the torque tube 16 during wind events. Sustained winds can create continuous uplift forces on the torque tube 16 which must be counteracted to prevent the torque tubes 16 from lifting off of its associated piers. Thus, by using the upper portion 480 of the bearing assembly 420, the associated bearing member 452 of the upper portion 480 can continue to provide reduced friction and wear from controlled pivoting of the torque tube 16. Additionally, when installing the torque tube 16, the torque tube can be lowered down onto the lower portion 482, then the upper portion 480 can be installed with the torque tube 16 resting on the lower portion 482.

This type of configuration can be particularly useful where the wind uplift forces, at a 20 mph horizontal east/west windflow are greater than the total weight supported by the piers 102 of the system. Such a wind could be sufficient to lift the torque tubes off of their respective bearings and thus generate component wear friction against a safety strap, such as the safety strap 321 illustrated in FIG. 10. For example, some arrangement can generate substantial lift when pivoted toward a "noon-angle" and subject to a 20 mph, horizontal wind. A net uplift force that can lift the torque tube 16 off of its associated bearing can be expressed as when the ratio, defined by the combined weight of the plurality of photovoltaic devices 14, which are pivoted toward a noon sun angle and the weight of the torque tube 16 and all of the other equipment supported by the torque tube, divided by the lift generated by the photovoltaic devices 14 under a 20 mph transverse horizontal wind, is less than one.

Some types of solar systems, such as the concentrated photovoltaic system illustrated schematically in FIG. 4, generally do not generate large uplift forces. For example, a system such as that illustrated in FIG. 4 under a sustained 20 mph horizontally directed east/west wind may not result in an uplift force on the torque tube 16 greater than the total weight supported by the pier 102. Thus, those types of systems can benefit from the reduced parts cost associated with the embodiments illustrated in FIGS. 5-13, in which there is only one bearing member extending around the lower side of the torque tube 16. Optionally, the safety strap 321 (FIG. 10) can be used to prevent an inadvertent dislocation of the torque tube from the associated bearing, such as that which may be generated by a large, transient wind gust.

As noted above, the simplified nature of the bearing members 252, 352, 452, in some embodiments, can allow these bearing members to be "snapped" or otherwise installed to the respective housings without tools. As such, the bearing members in the associated housings can be considered to form tool-less connections with each other. In some embodiments, the bearing members 252, 352, 452, can be made from a sheet material having a thickness of about 0.125". However, other thicknesses can also be used.

Figure 17:
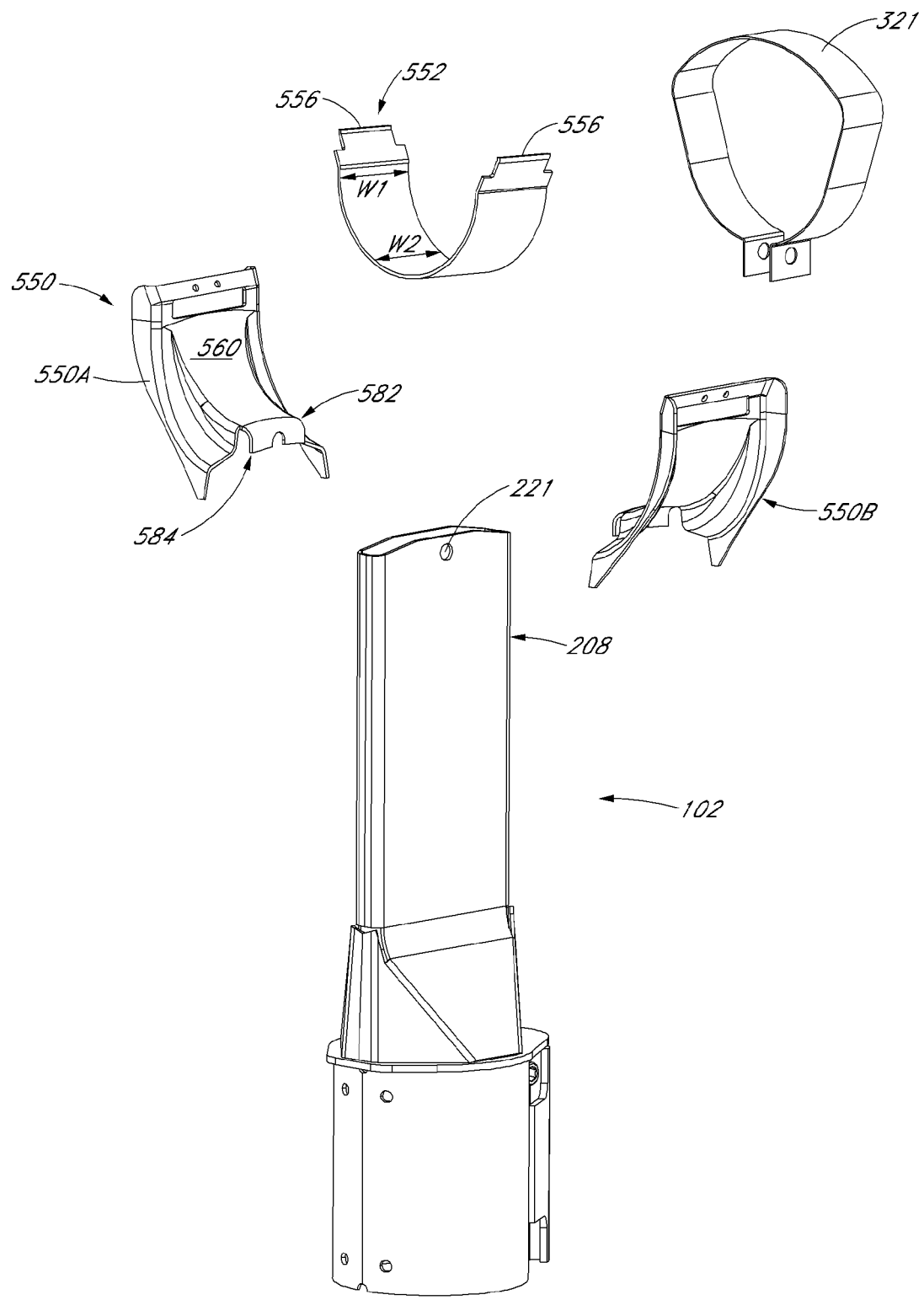
FIG. 17 is an exploded perspective view of the embodiment of FIG. 16.
Figure 18:
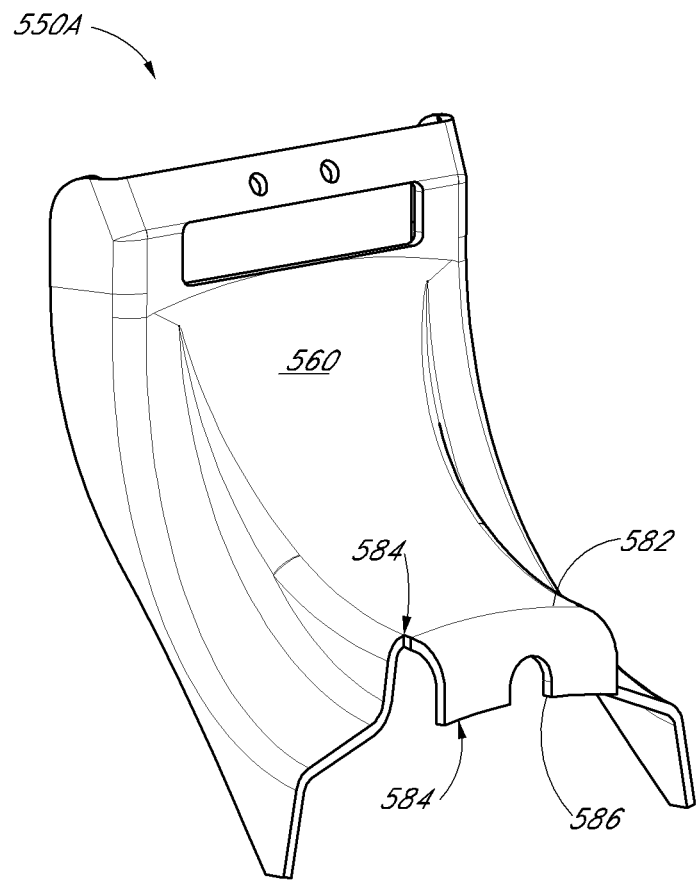
FIG. 18 is an enlarged perspective view of one part of the two-part housing illustrated in FIGS. 16 and 17.
Figure 19:
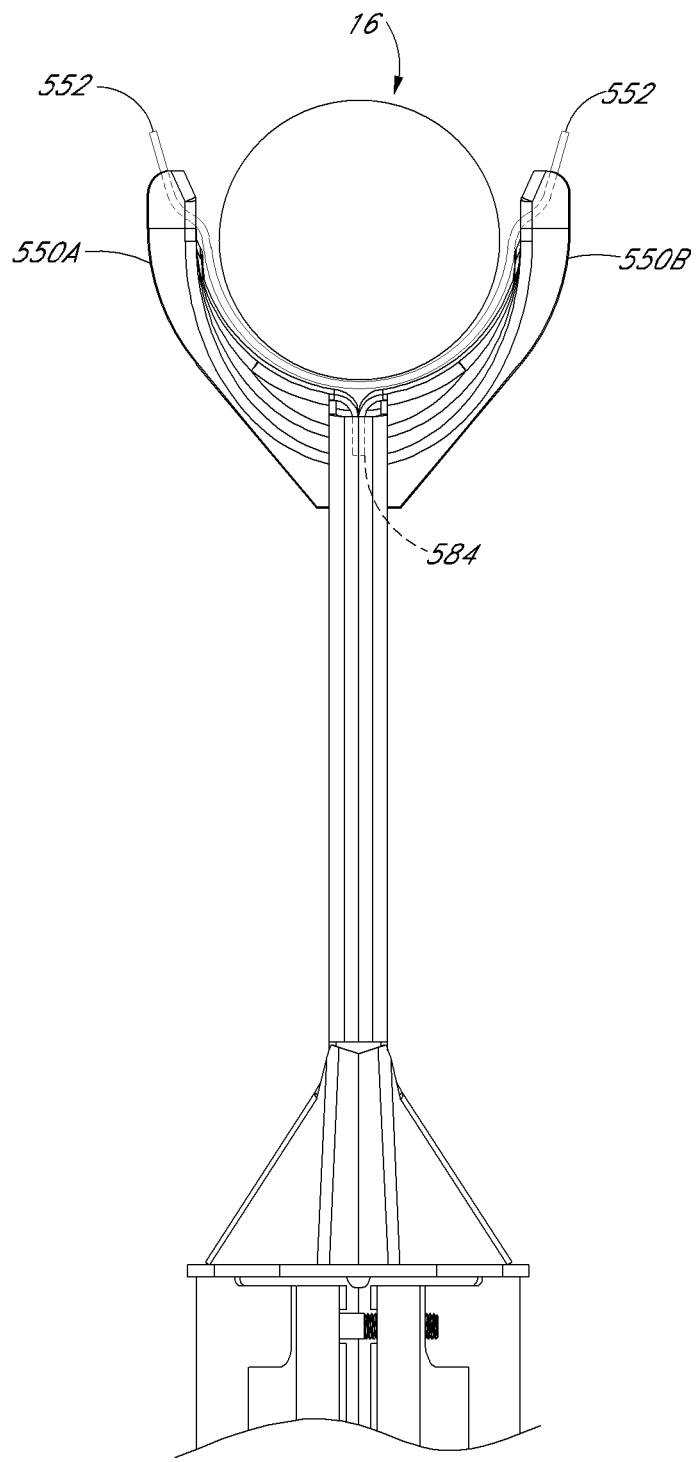
FIG. 19 is a front elevational view of the bearing assembly of FIG. 16 with the safety strap removed.

FIGS. 16-20 illustrate yet another embodiment of the bearing assembly 20, identified by the reference numeral 520. As shown in FIG. 17, the support surface 560 can include, optionally, a crowned portion 582. In the illustrated embodiment, the crowned portion 582 is generally convex on the upper surface of the support surface 560; the side of the support surface 560 which supports and contacts the bearing member 552.

In the illustrated embodiment, due to the crowned configuration of the crowned portion 582, the bearing member 552 can deform under the weight of a torque tube, such as the torque tube 16. Thus, although the bearing member 552 may be made from a thin sheet like material, such as an ultra high molecular weight polyethylene material, such sheet material can be distorted to follow the contour of the crowned portion 582, under the weight of a torque tube 16.

Optionally, a central portion of the bearing member 552 can be narrowed relative to the terminal ends 556 of the bearing member 552. For example, in the illustrated embodiment, a central portion of the bearing member 552 has a width W2 that is less than the width W1 at a portion of the bearing member 552 adjacent to the terminal ends 556.

The crowned portion 582 can be provided with any convex configuration. As such, housing 550 can better accommodate misalignments of the housing 550 with the final position of a torque tube 16.

Figure 20:
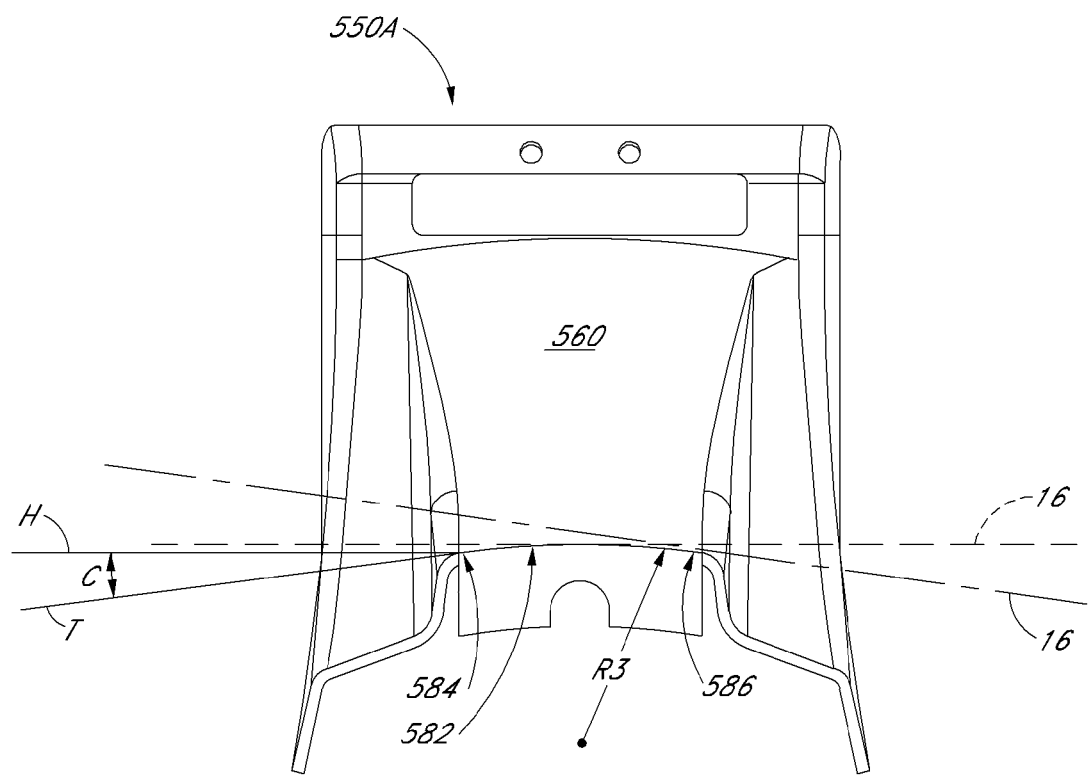
FIG. 20 is a side elevational view of the part of the housing illustrated in FIG. 18.

For example, as noted above, it is possible that after installation of a pier 102 and the housing such as the housing 550, the support surface 560 might not be exactly aligned or parallel with an outer surface of the torque tube 16 to be supported by the bearing assembly 520. For example, the support surface 560 might be inclined relative to the final position of the torque tube 16. FIG. 20 illustrates two possible final potential positions for the torque tube 16; an aligned, horizontal position identified by dashed line and a misaligned, inclined position identified by a dot-chain line.

With such a crowned configuration, the crowned portion 582 can help maintain a larger contact patch between the outer surface of the torque tube 16 and the bearing member 520. For example, in the embodiments where the support surface is flat, such as the support surfaces 260, 360, and 460, the contact patch between the outer surface of the torque tube 16 in the corresponding bearing member can be concentrated at the edge of the corresponding support surface when the torque tube 16 is misaligned with the corresponding bearing 20, because those support services are flat. However, where the support surface, such as the support surface 560, includes a crowned portion 582, for example, at a center or low point of the support surface 560, the crowned configuration can help provide a more continuous and therefore larger contact patch between the outer surface of the torque tube 16 and the bearing member. Such a configuration can help reduce the magnitude of stress concentrations between the outer surface of the torque tube 16 and the bearing member and thus reduce the speed of wearing of the bearing member.

In some embodiments, the crowned portion 582 of the support surface 560 can be configured to follow a single radius of curvature R3 between its forward and rear word axial edges 584, 586. However, other shapes can also be used.

In some embodiments, the convex portion 582 can be sufficiently curved such that a tangent line T extending from the forward axial edge 584 extends at an angle C relative to a horizontal plane H. In some embodiments, the angle C can be about 7°. However, other angles can also be used.

With continued reference to the FIGS. 17-20, the housing 550 can be made from one or more portions. In the illustrated embodiment, the housing 550 is made from two portions, 550A, 550B, however, the housing 550 can be made from any number of parts.

In the illustrated embodiment, the portions 550A, 550B have the same shape and can be identical to one another. Each of the portions 550A, 550B include stops 584 extending downwardly from a lower edge of the support surface 560. The stops 584 are positioned such that when the two portions 550A, 550B are juxtaposed to one another, their respective outward faces contact each other. As such, the stops 584 can be used to help align the portions 550A, 550B relative to each other.

In some embodiments, the portions 550A, 550B can be secured to each other prior to being mounted to a pier 102. Optionally, the portions 550A, 550B can be joined to the pier 102 and joined to each other at the time of installation. In some embodiments, the stops 584 can also include a recess, notch, or aperture 586 which can be aligned with the aperture 221 (FIG. 6). As such, the recess 586 can also assist in aligning the portions 550A, 550B with the desired location.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A sun-tracking photovoltaic solar collector array, the array comprising:
   a plurality of solar devices;
   a support assembly supporting the solar devices so as to be pivotable about a pivot axis, the support assembly comprising:
   a torque tube supporting the plurality of solar devices, the torque tube pivotable about the pivot axis;
   a bearing housing comprising a bearing support surface; and
   a bearing member connected to the bearing support surface, the bearing member comprising a reduced friction surface in sliding contact with an outer surface of the torque tube;
   wherein the torque tube and the bearing member are rotationally decoupled such that, when the torque tube rotates, the bearing member is stationary.

2. The array according to claim 1, wherein the bearing member comprises a plastic.

3. The array according to claim 2, wherein the bearing member comprises ultra high molecular weight polyethylene.

4. The array according to claim 1, wherein the bearing member comprises first and second protruding portions extending from the first and second ends, respectively.

5. The array according to claim 4, wherein the first end comprises a shoulder extending at an angle transverse to a longitudinal axis of the first protruding portion.

6. The array according to claim 1, further comprising a pier supporting the bearing housing at a position above a support surface.

7. The array according to claim 1, wherein the bearing housing comprises at least a first connector portion configured to engage a first end of the bearing member so as to resist movement of the bearing member in at least a first direction.

8. The array according to claim 1, wherein the bearing housing and the bearing member are connected by a tool-less connection.

9. The array according to claim 8, wherein the tool-less connection comprises apertures in the bearing housing and ends of the bearing member which extend through the apertures.

10. The array according to claim 1, wherein the bearing housing comprises an upper portion and a lower portion, the upper and lower portions surrounding the torque tube.

11. The array according to claim 1, wherein the bearing housing and the bearing member comprise respective curved surfaces shaped to receive and support the torque tube as the torque tube rotates.

12. A sun-tracking photovoltaic solar collector array, the array comprising:
   a plurality of solar devices;
   a support assembly supporting the solar devices so as to be pivotable about a pivot axis, the support assembly comprising:
   a torque tube supporting the plurality of solar devices, the torque tube pivotable about the pivot axis;
   a bearing housing comprising a bearing support surface;

a bearing member connected to the bearing support surface, the bearing member comprising a reduced friction surface in sliding contact with an outer surface of the torque tube; and a tool-less connection which connects the bearing member and the bearing housing.

13. The array according to claim 12, wherein the torque tube and the bearing member are rotationally decoupled such that, when the torque tube rotates, the bearing member is stationary.

14. The array according to claim 12, wherein the bearing member comprises a plastic.

15. The array according to claim 12, wherein the tool-less connection comprises apertures in the bearing housing and ends of the bearing member which extend through the apertures.

16. The array according to claim 12, further comprising a pier supporting the bearing housing at a position above a support surface.

17. A sun-tracking photovoltaic solar collector array, the array comprising:

a plurality of photovoltaic devices;

a support assembly supporting the photovoltaic devices so as to be pivotable about a pivot axis, the support assembly comprising:

at least a first pivot supporting the plurality of photovoltaic modules;

at least a first bearing supporting the first pivot so as to be pivotable about the pivot axis; and at least one pier supporting the bearing at a position above a support surface, the bearing comprising at least a first reduced friction member extending around at least a portion of the first pivot, wherein the first pivot and the first reduced friction member are rotationally decoupled.

18. The array according to claim 17, wherein the first bearing and the first reduced friction member are connected with a tool-less connection.

19. The array according to claim 17, wherein the first reduced friction member comprises a plastic.

20. The array according to claim 17, further comprising a pier supporting the bearing housing at a position above a support surface.

* * * * *